US010298563B2

(12) United States Patent
Esdaile

(10) Patent No.: US 10,298,563 B2
(45) Date of Patent: May 21, 2019

(54) MULTI-FACTOR AUTHORIZATION FOR IEEE 802.1X-ENABLED NETWORKS

(71) Applicant: Aruba Networks Inc., Sunnyvale, CA (US)

(72) Inventor: Cameron Esdaile, San Francisco, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/699,420

(22) Filed: Apr. 29, 2015

(65) Prior Publication Data

US 2016/0323265 A1    Nov. 3, 2016

(51) Int. Cl.
*H04L 29/06* (2006.01)
*H04W 12/06* (2009.01)

(52) U.S. Cl.
CPC ........ *H04L 63/0823* (2013.01); *H04L 63/083* (2013.01); *H04L 63/0876* (2013.01); *H04W 12/06* (2013.01)

(58) Field of Classification Search
CPC ............. H04L 63/0823; H04L 63/0876; H04L 63/083; H04W 11/06
USPC ............................................................ 726/7
See application file for complete search history.

(56) References Cited

U.S. PATENT DOCUMENTS

| 8,732,853 | B1 * | 5/2014 | Byrne | ................. | H04L 63/0838 713/183 |
| 2005/0131997 | A1 | 6/2005 | Lewis et al. | | |
| 2007/0271457 | A1 | 11/2007 | Patil et al. | | |
| 2010/0293590 | A1 | 11/2010 | Dandabany | | |
| 2011/0247055 | A1 | 10/2011 | Guo et al. | | |
| 2012/0222099 | A1 * | 8/2012 | Narendra | ............ | H04L 63/0853 726/6 |
| 2013/0167196 | A1 * | 6/2013 | Spencer | .................. | H04W 8/22 726/3 |
| 2013/0269011 | A1 | 10/2013 | Wilson | | |
| 2014/0047510 | A1 | 2/2014 | Belton et al. | | |

(Continued)

FOREIGN PATENT DOCUMENTS

WO    WO-2005032042    4/2005

OTHER PUBLICATIONS

PCT International Search Report issued in Application No. PCT/US2016/029728, dated Aug. 1, 2016, 4 pages.

*Primary Examiner* — Kambiz Zand
*Assistant Examiner* — Tongoc Tran
(74) *Attorney, Agent, or Firm* — Hewlett Packard Enterprise Patent Department

(57) ABSTRACT

The present disclosure discloses a system and method for providing multi-factor authorization for IEEE 802.1x-enabled networks. Specifically, a network device authenticates a client device to obtain access to network resources in a network via a network authentication protocol. The network device then detects a device quarantine trigger indicating an increased level of suspicion that a current user of the client device is a non-authenticated user. In response to the device quarantine trigger, the network device temporarily places the client device from an authenticated state to a quarantined state pending completion of a particular workflow by the current user. The client device has limited access to the network resources while in the quarantined state regardless of a previous successful user and/or device authentication.

18 Claims, 8 Drawing Sheets

(56) References Cited

U.S. PATENT DOCUMENTS

| | | | | |
|---|---|---|---|---|
| 2014/0282958 A1* | 9/2014 | Salonen | ............. | H04L 63/0861 |
| | | | | 726/7 |
| 2014/0325220 A1* | 10/2014 | Tunnell | .................. | G06F 21/00 |
| | | | | 713/168 |
| 2016/0055327 A1* | 2/2016 | Moran | .................... | G06F 21/32 |
| | | | | 726/19 |
| 2016/0087957 A1* | 3/2016 | Shah | .................... | H04L 63/205 |
| | | | | 726/1 |
| 2016/0112452 A1* | 4/2016 | Guevin | ................ | H04L 61/103 |
| | | | | 726/1 |
| 2016/0164866 A1* | 6/2016 | Oberheide | ......... | H04L 63/0861 |
| | | | | 726/1 |

\* cited by examiner

MULTI-FACTOR AUTHORIZATION FOR IEEE 802.1X-ENABLED NETWORKS

FIELD

Embodiments of the present disclosure relate to network authentications. In particular, embodiments of the present disclosure describe a system and a method for providing multi-factor authorization for IEEE 802.1x-enabled networks.

BACKGROUND

Currently, when a client device connects to or is provisioned access to an IEEE 802.1x enabled network, the client device will transparently connect to the network on all subsequent authentication attempts. The transparent access may be delivered via techniques, such as cached credentials, device certificates, etc. For example, the client device that has been previously authenticated under IEEE 802.1x protocol may present the device credentials to the authentication server without the need for any additional user inputs.

However, there is no way for the network infrastructure to authorize a user behind the client device. Thus, the network access is only secured by the local password policy that prevents other users from misusing the client device and inappropriately accessing network resources. If an illegal user gains access to the client device before the client device is locked by local password, or if the illegal user steals the local password to the client device, the illegal user would be able to obtain the same access to network resources as the owner of the client device.

To address the above concern, a network administrator can configure the network policy to require network users change their network credentials at frequent intervals. As a result, the network infrastructure exposure can be limited to the extent of the password rotation policy. However, such network policy often applies to all network users and creates great inconvenience and burdens to the legitimate network users.

Therefore, it is desirable to have additional security protection in an IEEE 802.1x enabled network to fulfill at least two purposes. First, a user who illegally gains possession of a previously authenticated client device will not be able to receive authentication to the network resources. Second, the additional security protection adds no undue burden to the legitimate users of the properly authenticated client devices.

DETAILED DESCRIPTION

In the following description, several specific details are presented to provide a thorough understanding. While the context of the disclosure is directed to network authentications, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

BRIEF DESCRIPTION OF THE DRAWINGS

The present disclosure may be best understood by referring to the following description and accompanying drawings that are used to illustrate embodiments of the present disclosure.

OVERVIEW

Embodiments of the present disclosure relate to network authentications. In particular, embodiments of the present disclosure describe a system and a method for providing multi-factor authorization in an IEEE 802.1x enabled network.

With the solution provided herein, a network device authenticates a client device to obtain access to network resources in a network via a network authentication protocol. The network device then detects a device quarantine trigger. The device quarantine trigger may be triggered at a predefined interval, e.g., once a week, a month, a quarter, a semester, etc., or on-demand based on an indication of an increased level of suspicion that a current user of the client device is a non-authenticated user, or a combination of both. In response to the device quarantine trigger, the network device temporarily places the client device from an authenticated state to a quarantined state pending completion of a particular workflow by the current user. The client device has limited access to the network resources while in the quarantined state regardless of a previous successful user and/or device authentication.

Next, the network device initiates a multi-factor authentication that requires the current user of the client device to complete the particular workflow to confirm the current user's identity. In response to completion of the particular workflow by the current user, the network device places the client device from the quarantined state to the authenticated state. In response to failure of the particular workflow by the current user, the network device places the client device from the quarantined state to an unauthenticated state. The client device has limited or no access to the network resources while in the unauthenticated state.

In some embodiments, the particular workflow is initiated only for a subset of authenticated client devices in the network. Furthermore, a particular device quarantine trigger defined by network policies is triggered for each authenticated client device in the subset.

Client Device Credential Provisioning

Figure 1:
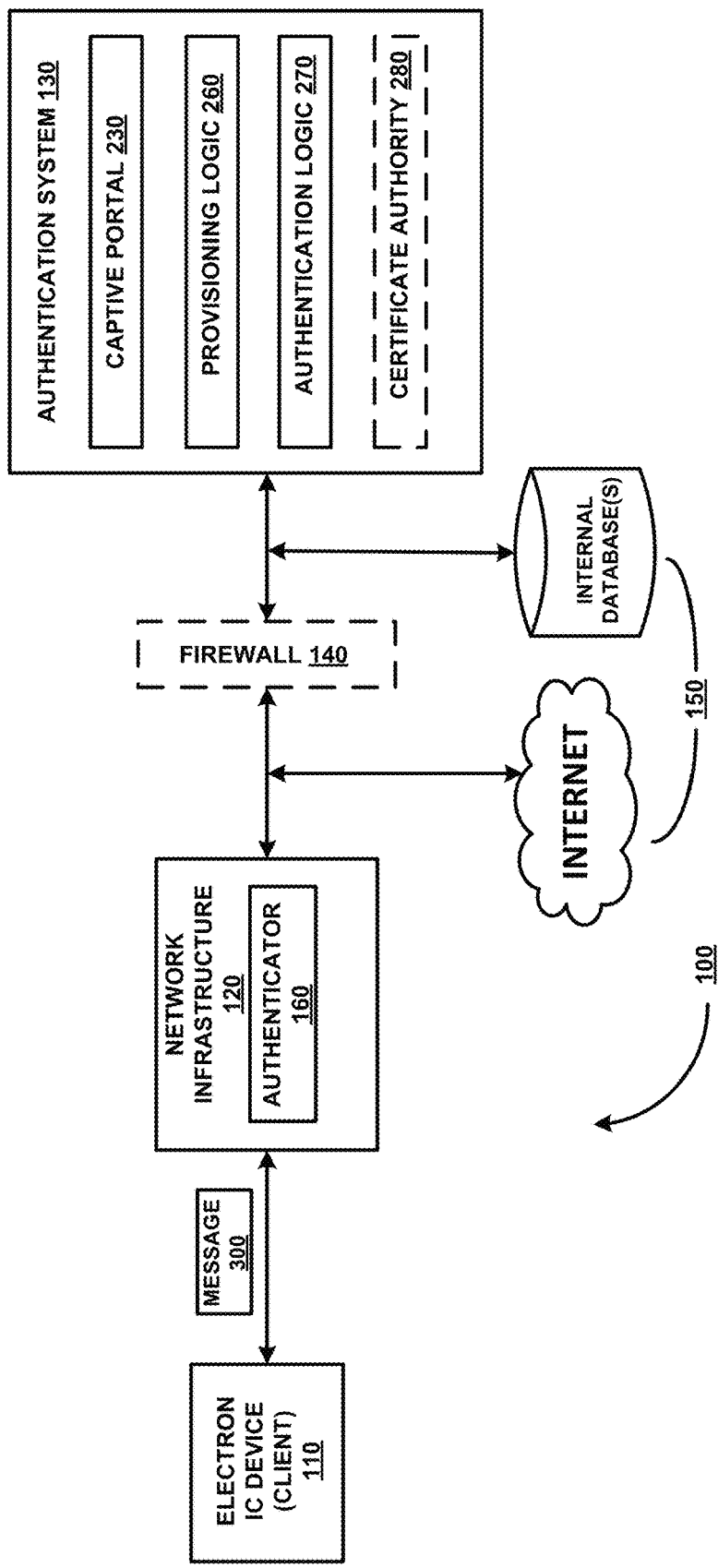
FIG. 1 is a block diagram illustrating an exemplary network environment that supports IEEE 802.1x authentication according to embodiments of the present disclosure.
Figure 2A:
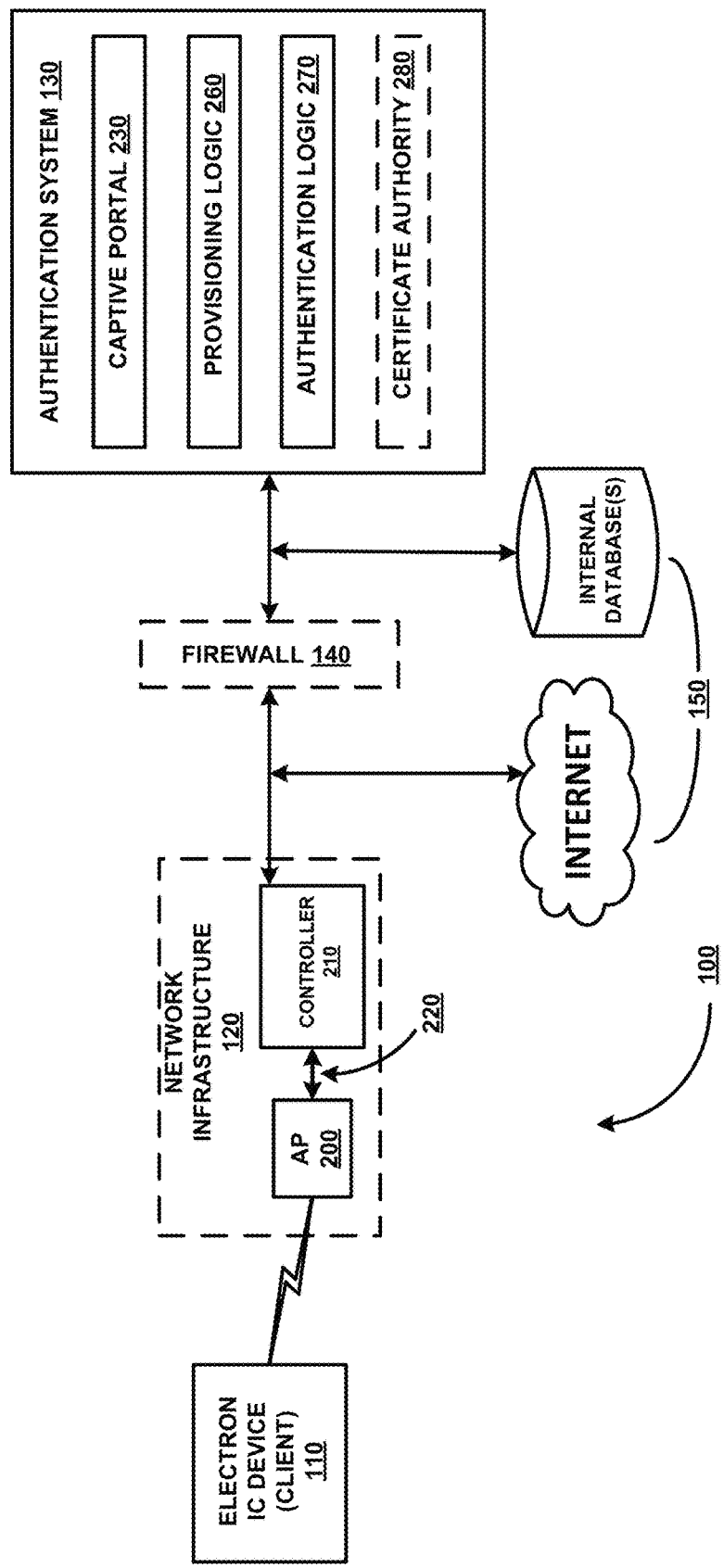
FIG. 2A-2B show exemplary network infrastructures that support device credential provisioning according to embodiments of the present disclosure.
Figure 2B:
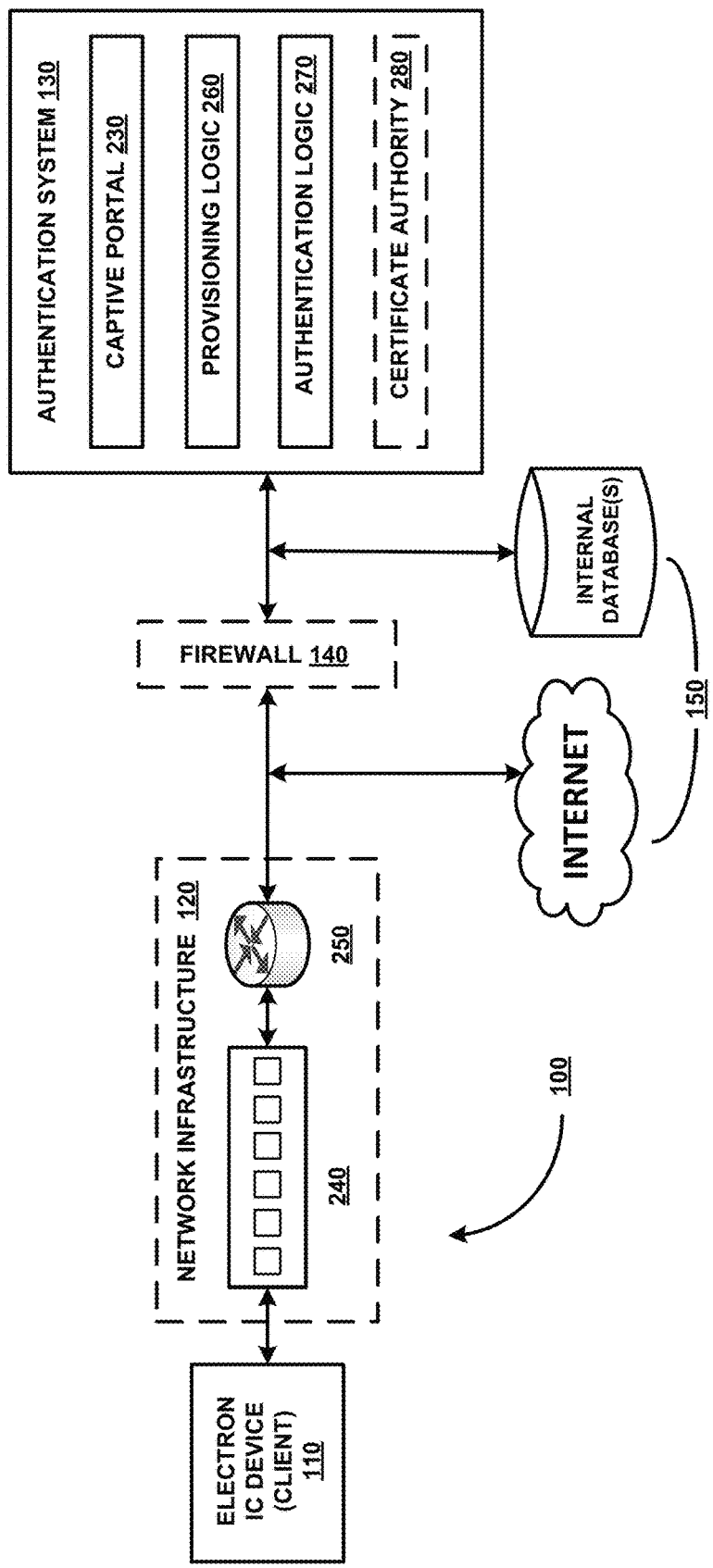

FIG. 1 is a block diagram illustrating an exemplary network environment that supports IEEE 802.1x authentication according to embodiments of the present disclosure. FIG. 2A-2B show exemplary network infrastructures that support device credential provisioning according to embodiments of the present disclosure.

According to this embodiment of the disclosure, network 100 is a local area network (LAN) with port-based network access control in accordance with Institute of Electrical and Electronic Engineers (IEEE) 802.1X entitled "Port Based Network Access Control" (2010). Such access control is adapted to provide security against an electronic device gaining unauthorized access to various network resources 150 (e.g., Internet, internal databases, etc.).

More specifically, authentication in accordance with the IEEE 802.1X Standard involves communications between (i) an electronic device (e.g., client device 110) seeking to join network 100 and (ii) certain components forming network 100, namely network infrastructure 120 and an authentication system 130. As shown, an optional firewall 140 may be positioned to isolate authentication system 130 from publicly accessible services. However, with respect to the operational flow described below, firewall 140 will not be discussed.

As illustrated, network infrastructure 120 is a collection of electronic devices that is adapted to support communications between authentication system 130 and client device 110. Moreover, network infrastructure 120 is adapted to initially restrict access to network resources 150 until the identity of client device 110 has been authenticated. The components formulating network infrastructure 120 may vary, depending on the selected network architecture.

For instance, as shown in FIG. 2A, where network 100 is a wireless local area network (WLAN), network infrastructure 120 comprises an access point (AP) 200 that is coupled to controller 210 over interconnect 220. Herein, AP 200 is configured to establish communications with wireless electronic devices within its coverage area such as client device 110 for example. Controller 210 is configured to monitor messages received by AP 200 from client device 110 and determine what "role" is to be assigned to client device 110. In other words, controller 210 assigns client device 110 to a specific role (e.g. network access level), which may partially or completely restrict access by client device 110 to network resources 150 until the identity of client device 110 has been authenticated. As an example, controller 210 may restrict access to network resources 150 by redirecting certain messages from client device 110 to a Captive Portal instance 230 supported by authentication system 130.

Alternatively, as shown in FIG. 2B, where network 100 is a local area network (LAN) supporting wired connectivity with client device 110, network infrastructure 120 comprises one or more data transfer devices, such as manageable switch 240 (e.g. 802.1X switch) and router 250, that also determine a particular role for client device 110. Where client device 110 is attempting to join network 100 for the first time, manageable switch 240 assigns client device 110 to a provisioning role, which may trigger redirection of certain messages from client 110 to Captive Portal instance 230 until the identity of client device 110 has been authenticated.

Referring back to FIG. 1, after a communication path has been established with client device 110, an electronic device within network infrastructure 120, such as controller 210 or switch/router 240 and 250 (hereinafter generally referred to as an "authenticator" 160), may perform device fingerprinting. "Device fingerprinting" involves the monitoring of initial messages transmitted by client device 110 to determine whether client device 110 has been previously authenticated.

One type of "device fingerprinting" involves analysis of contents within a DHCP Options field of a DHCP Discovery message. Client device 110 broadcasts a DHCP Discovery message in efforts to obtain an Internet Protocol (IP) address for use on network 100. In many cases, the content within the DHCP Options field suggests the type of device, which may assist authenticator 160 in determining whether client device 110 should be placed into a provisioning role.

More specifically, if authenticator 160 is unable to recognize an identity of client device 110 as the device type is not identifiable, client device 110 is placed into a provisioning role, which restricts its access to network resources 150 and, in some cases, may trigger communications with Captive Portal instance 230 for subsequent requests for access to network resources 150.

Another type of "device fingerprinting" may involve authenticator 160 gaining access to a media access control (MAC) address of client device 110. This may be accomplished by extracting the source MAC address from signaling originating from client device 110. The MAC address of control device 110 is compared to stored MAC addresses for devices that have been previously authenticated. If the MAC address of client device 110 fails to match any of the stored MAC addresses, authenticator 160 places client device 110 into a provisioning role.

It is contemplated that the stored MAC addresses for previously authenticated client devices may be contained within a MAC table, which is updated at a periodicity selected by the network administrator. Hence, if there is no activity from one of the client devices for a predetermined period of time, the MAC address of that device is removed from the MAC table.

Yet another type of "device fingerprinting" may involve authenticator 160 comparing a username provided during an initial message exchange between client device 110 and authentication system 130. The username provided by control device 110 may be compared to active usernames that are used by previously authenticated electronic devices and stored within network infrastructure 120 and/or authentication system 130.

Once client device 110 has been assigned a provisioning role, namely the device is substantially restricted (or precluded) from accessing network resources 150, any messages from device 110 may be redirected by authenticator 160 to Captive Portal instance 230 located in authentication system 130. The redirected messages are for those situations where client device 110 has not been authenticated which, in some situations, may be due to the lack of provisioning of unique device credentials to client device 110.

As an illustrative example, in response to a message 300 (e.g., HTTP Get Request message) from client device 110 placed in a provisioning role, authenticator 160 redirects the message to Captive Portal instance 230 provided by authentication system 130. Provisioning logic 260 within authentication system 130 analyzes the message to determine the type of client device 110 and infers its capabilities.

Multi-Factor Authorization

A. Client Device Onboarding Process

Figure 3:
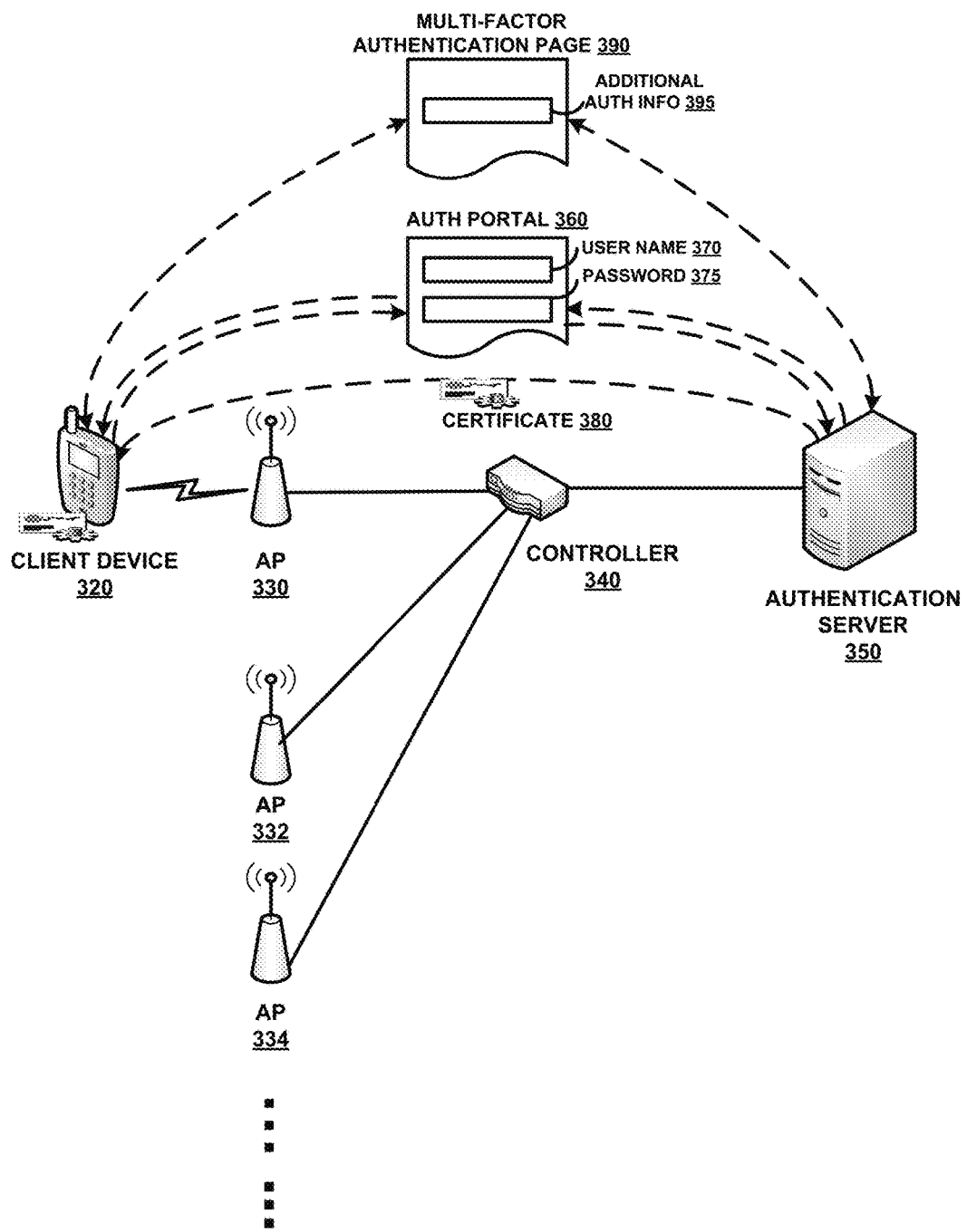
FIG. 3 is a block diagram illustrating an exemplary network environment for multi-factor authorization in an IEEE 802.1x enabled network according to embodiments of the present disclosure.

FIG. 3 is a block diagram illustrating an exemplary network environment for multi-factor authorization in an IEEE 802.1x enabled network according to embodiments of the present disclosure. FIG. 3 includes at least a client device 320, a number of access points (such as, AP 330, AP 332, AP 334 . . . ), a network controller 340, and an authentication server 350.

Each AP (e.g., AP 330, AP 332, AP 334 . . . ) provides network services to zero or more client devices. Specifically, each AP operates on a particular wireless communication channel and communicates with its client devices on the particular wireless communication channel.

Network controller 340 generally refers to a controlling device that manages other network devices such as wireless access points. Network controller 340 may handle automatic adjustments to radio frequency power, wireless channels, wireless authentication, and/or security.

Client device 320 may be associated with a corporate user or a guest user. A network administrator may configure network policies to grant a corporate user different access to network resources than guest user.

Authentication server 350 generally provides a network service that applications use to authenticate the credentials, such as usernames and passwords. When a client device (e.g., client device 320) submits a valid set of credentials, it receives a cryptographic certificate 380 that it can subsequently use to access various services. Authentication typically is used as the basis for authorization, which is the determination whether a privilege may be granted to a particular user or process, privacy, which keeps information from becoming known to non-participants, and non-repudiation.

In some embodiments, authentication server 350 is a Remote Authentication Dial In User Service (RADIUS). RADIUS generally refers to a client/server protocol that runs in the application layer using UDP as transport. RADIUS often serves as the backend for authentication processes compliant with IEEE 802.1X protocol.

For example, when client device 320 initially attempts to access network resources, client device 320 sends a request to the network. The request may be received by AP 320, which forwards it to network controller 340. Network controller 340 determines that client device 320 has not been authenticated by the network, and thus redirects client device 320 to an authentication portal 360, which is a website prompted in a web browser such that a user of client device 320 can input his/her network credentials (such as, user name 370 and password 375) for authentication. The user input then gets sent to authentication server 350, which looks up its authentication database and decides to grant or deny network access to the user. If authentication server 350 decides to grant network access to the user of client device 320, authentication server 350 will issue a certificate 380 to client device 320. In subsequent requests to the network, client device 320 will present the received certificate 380 such that network controller 340 will not redirect client device 320 to the authentication website (e.g., captive portal 360) after its initial authentication.

In some embodiments, when a user of client device 320 presents username and password credentials for network authorization, the network authentication system will recognize that the user is using a weak authentication mechanism, and therefore will redirect the user to a secure web authentication portal 360 where the user of client device 320 is challenged with user name 370 and password 375. Upon receiving valid user credentials by the network authentication system, certificate 380 will be issued to client device 320. Certificate 380 can be installed locally on client device 320 and presented to the network with subsequent network requests. Furthermore, certificate 380 can be revoked in the user reports that client device 320 is stolen.

B. Multi-Factor Authentication (MFA)

Multi-factor authentication (MFA) generally refers to a computer access control in which a user can pass by successfully presenting several separate authentication stages. The multiple factors include, but are not limited to, knowledge factors, possession factors, inherence factors, etc. Knowledge factors require a user to prove his/her knowledge of a secret in order to authenticate, e.g., a password, a personal identification number (PIN), one or more secret questions, etc.

Possession factors require a user to prove possession of a key that embodies a secret. For example, disconnected tokens having no connections to the client device can be used to generate a token dynamically. The user will view the disconnected token in a display and manually input the token as additional authentication information 395 in a multi-factor authentication page 390. In some embodiments, connected tokens can be physically connected to client device and transmit data automatically. Connected tokens include a number of different types, including but not limited to card readers, wireless tags and USB tokens.

Inherence factors generally refer to factors associated with the user. Inherence factors usually involve biometric authentication, for example, fingerprint readers, retina scanners, voice recognition, etc.

Conventionally, MFAs are used in web server authentications rather than a transparent process seamlessly integrated with network authentication. A simple combination of MFA with network authentication requires multi-factor authentication workflow to be completed with each network authentication request. Although this approach increases the level of security, it poses a significant usability issue to the users of client devices in the network. According to embodiments of the present disclosure, the network selectively triggers MFA to only a subset of authenticated client devices, which are considered suspicious due to breach of various security policies defined by network administrators.

C. Two-Layer Authentication Architecture with Periodical MFA

Figure 4A:
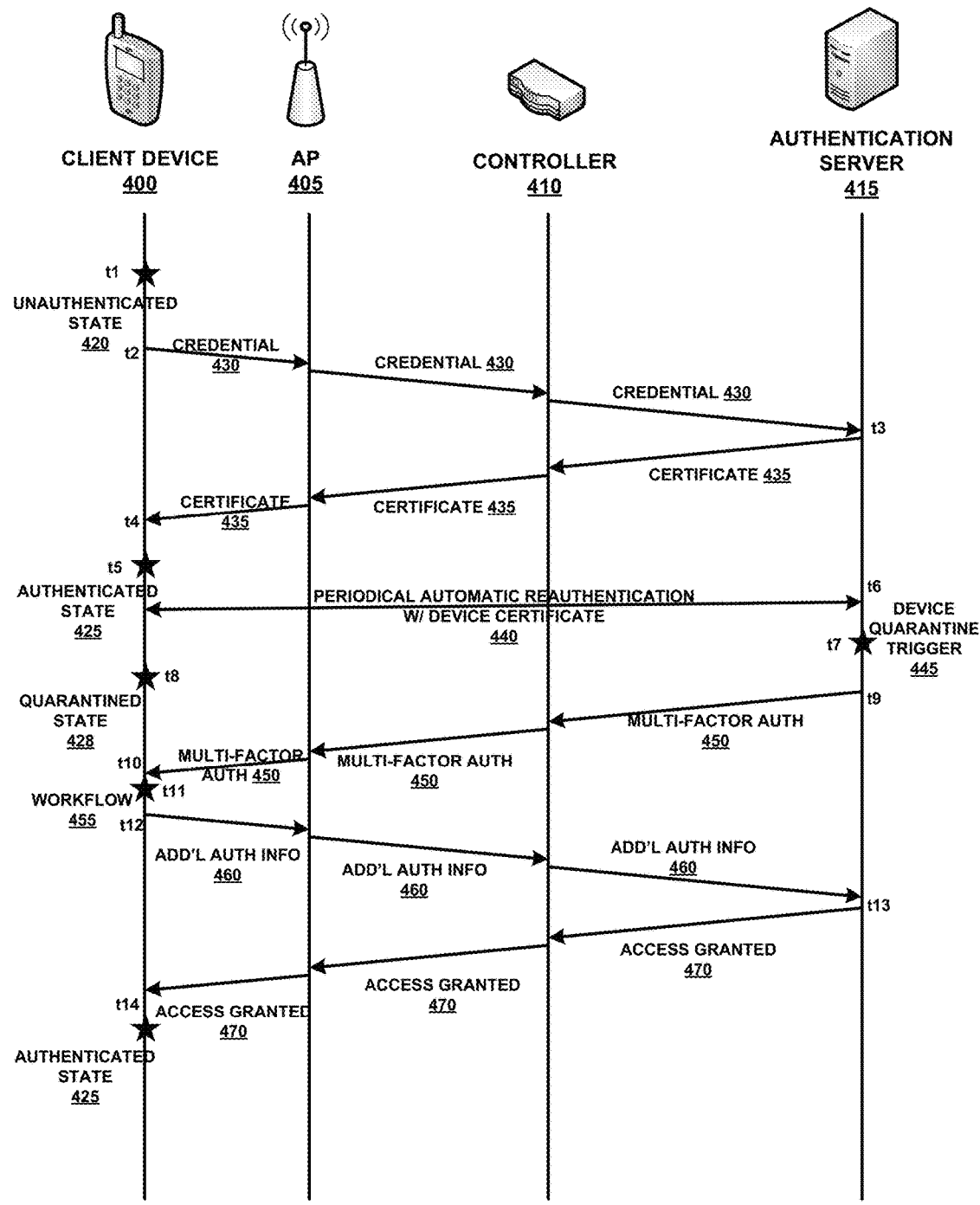
FIGS. 4A-4B are sequence diagrams illustrating exemplary network communication exchanges involved in multi-factor authorization in an IEEE 802.1x enabled network according to embodiments of the present disclosure.
Figure 4B:
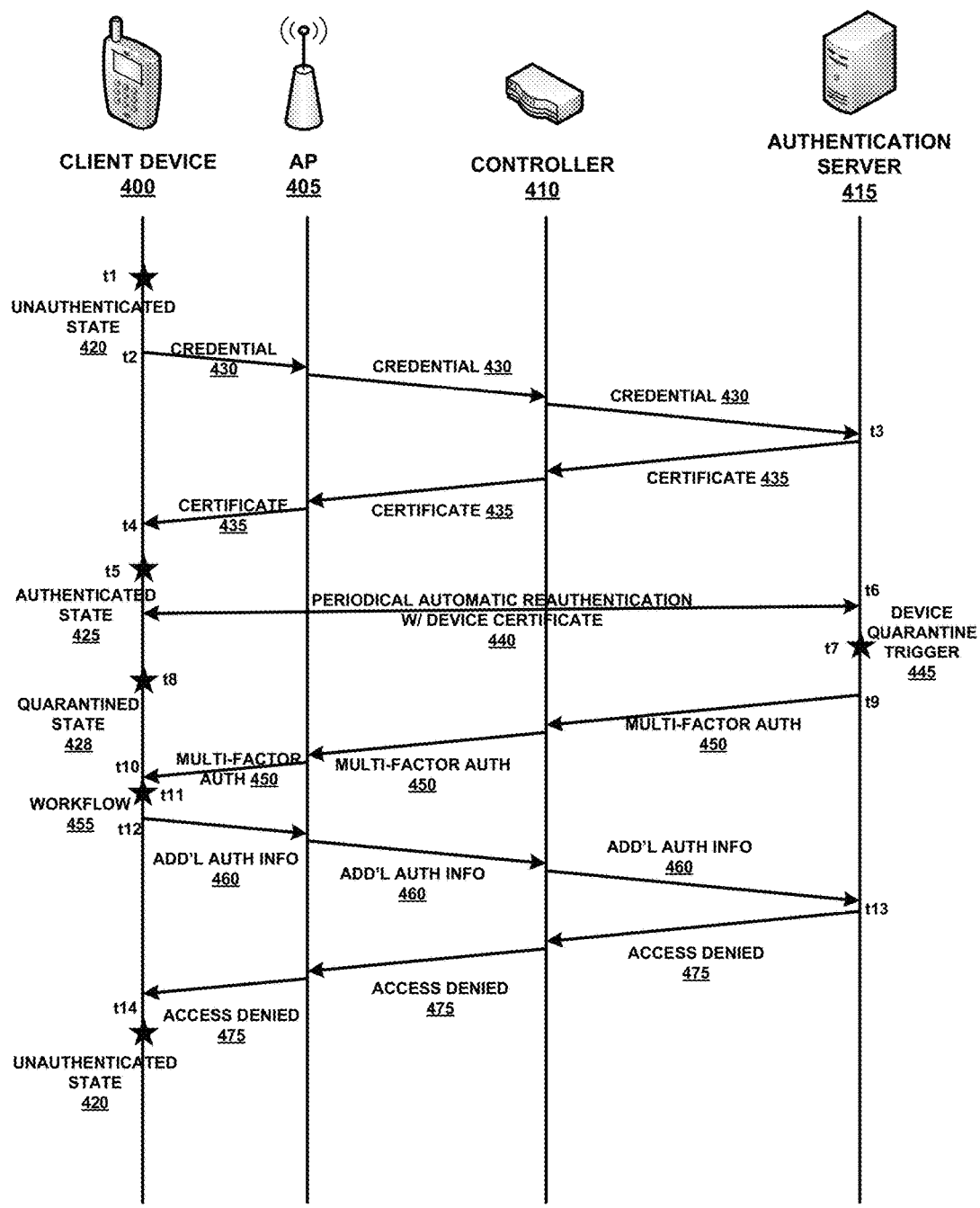

FIGS. 4A-4B are sequence diagrams illustrating exemplary network communication exchanges involved in multi-factor authorization in an IEEE 802.1x enabled network. FIGS. 4A-4B include at least a client device 400, an AP 405, a network controller 410, and an authentication server 415 interconnected in a network. As explained in details below, during this process, client device 400 has been successfully authenticated via an IEEE 802.1x network authentication protocol through either a user name and password or a valid device certificate. Nevertheless, client device 400 is placed from an authenticated state to a quarantined state when the network detects a particular trigger. The current user of client device 400 is then challenged to complete a particular workflow to verify his/her identity.

Thereafter, authentication server 415 will place client device 400 back to the authenticated state from the quarantined state if the current user has completed the particular workflow. On the other hand, authentication server 415 will place client device 400 back to an unauthenticated state from the quarantined state despite that client device 400 is presenting valid credentials and/or device certificates for network access, if the current user fails to complete the particular workflow.

Specifically, at time point t1, client device 400 is initially placed in an unauthenticated state 420. Then, at time point t2, client device 400 sends its credential information 430 to AP 405, which forwards credential information 430 to network controller 410. Network controller 410 will then forward credential information 430 to backend authentication server 415. In particular, network controller 410 may do so by redirecting user to an authentication portal associated with authentication server 415 where the user can input credential information 430. Upon receiving credential information 430, authentication server 415 will perform the authentication procedure. If successfully authenticated, client device 400 will be issued a device certificate 435. At time point t3, authentication server 415 sends device certificate 435 for client device 400 to network controller 410, which forwards the device certificate 435 to client device 400 via AP 405. At time point t4, client device 400 receives device certificate 435. At time point t5, the user installs device certificate 435 on client device 400 and thereafter client device 400 restarts device onboarding process with authentication server 415 and transitions to an authenticated state 425 upon presenting the newly installed device certificate 435 and successful authentication.

Periodically, authentication server 415 may require client device 400 that is placed in authenticated state 425 to perform automatic re-authentication with device certificate 440. Specifically, client device 400 will be asked to present a valid device certificate to the network in order to remain in authenticated state 425. These communication exchanges can happen in the background processes without the device user's knowledge.

In some embodiments, at time point t7, authentication server 415 may be notified by the network infrastructure that one or more device quarantine triggers 445 are detected. Accordingly, client device 400 is immediately placed in a quarantined state 428. Thereafter, client device 400's access to network resources is temporarily suspended or limited during the period of time when it is in quarantined state 428. It is important to note that, even though client device 400 possesses a valid device certificate and presents the device certificate to the network, its access to network resource is still suspended or limited. In some embodiments, device quarantine trigger 445 may be triggered at a fixed interval, for example, once per week, once per month, once per quarter, once per semester, etc. In some embodiments, the network may detect that the posture or geolocation of client device 400 has changed, which raise the level of suspicion of the current user of client device 400. Therefore, the network activates device quarantine trigger 445. In some embodiments, a policy engine of the network may detect a few consecutive failed password authentication attempts. Therefore, the network will activate device quarantine trigger 445.

Such device quarantine trigger 445 also will trigger a multi-factor authentication process 450. Thus, at time point t9, authentication server 415 sends a multi-factor authentication request 450 to network. Client device 400 receives multi-factor authentication request 450 at time point t10. Note that this can also be accomplished by redirecting user of client device 400 to a multi-factor authentication web page for user input of additional authentication information. For example, at time point t11, the user of client device 400 may be presented with instructions to follow a specified workflow 455 in order to obtain the additional authentication information necessary for releasing client device 400 from quarantined state 428.

Workflow 455 is designed to verify identity of the current user of client device 400. It can incorporate any existing or new techniques for user identification. For example, in some embodiments, the user may be challenged to answer a set of questions. In some embodiments, the user may be asked to perform a sequence of tasks to retrieve a token. In some embodiments, the user may be required to report to a certain place or person (e.g., reception or IT helpdesk) for identity verification.

At time point t12, client device 400 acquires additional authorization information 460 and transmits it to AP 405. AP 405 forwards additional authorization information 460 to network controller 410, which forwards it to authentication server 415.

At time point t13, based on received additional authorization information 460 from client device 400, authentication server 415 determines whether to grant or deny network access by client device 400. For example, in FIG. 4A, authentication server 415 determines that additional authorization information 460 adequately allows for identification of the current user of client device 400, and therefore grants access to client device 400. Specifically, authentication server 415 can transmit an access granted message to client device 400 via network controller 410 and AP 405. Also, authentication server 415 will place client device 400 from quarantined state 428 back to authenticated state 425. Thereafter, client device 400 will continue to have access to network resources with a valid device certificate that was previously issued by authentication server 415 to client device 400.

In another example as illustrated in FIG. 4B, authentication server 415 determines that additional authorization information 460 fails to identify a legitimate user of client device 400, and therefore denies access to client device 400. Specifically, authentication server 415 can transmit an access denied message to client device 400 via network controller 410 and AP 405. Also, authentication server 415 will place client device 400 from quarantined state 428 to unauthenticated state 420. Thereafter, client device 400 will no longer have any access to network resources even though client device 400 has been installed with a valid device certificate that was previously issued by authentication server 415.

Process for Providing Multi-Factor Authorization in IEEE 802.1x Enabled Network

Figure 5:
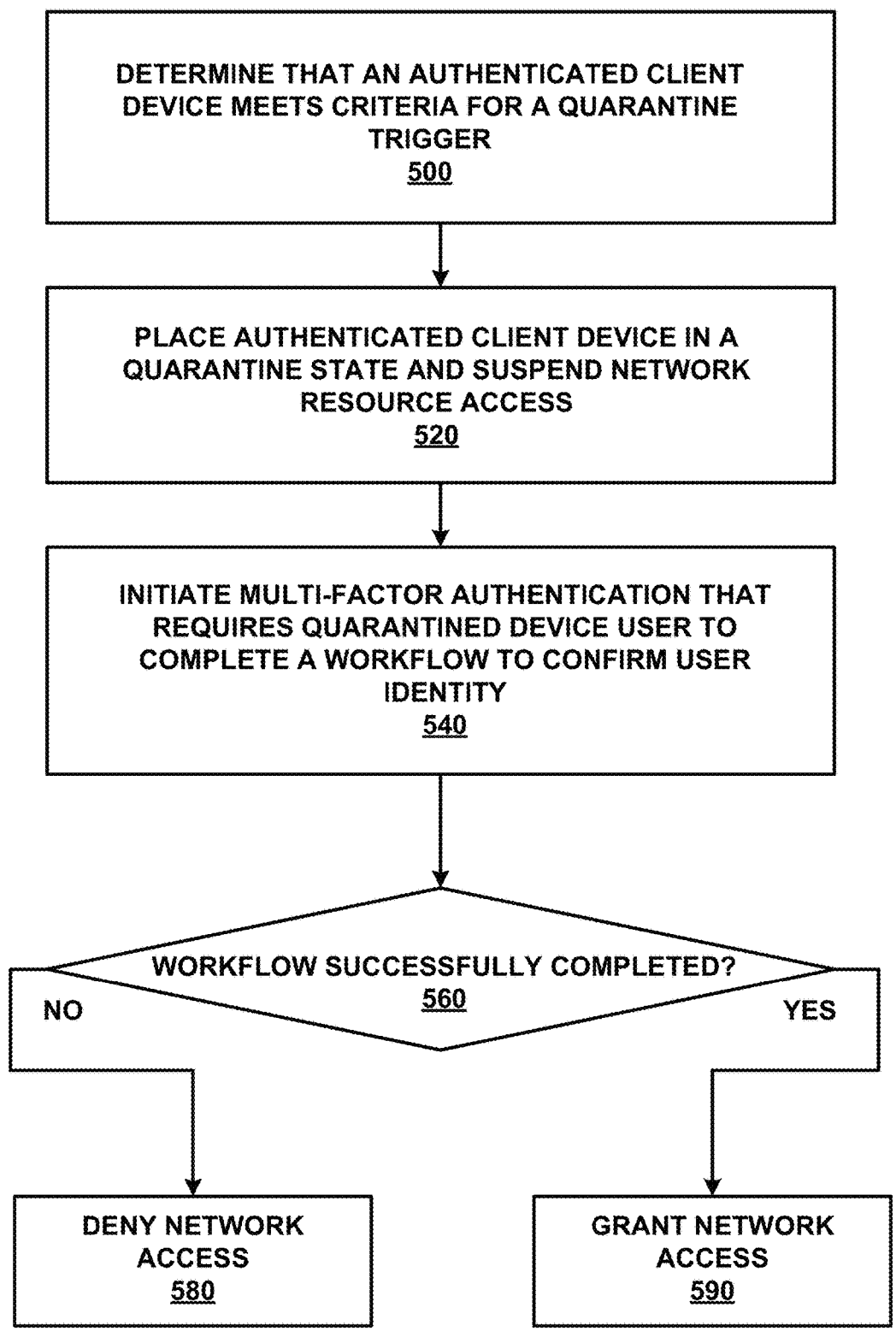
FIG. 5 is a flowchart illustrating a process for providing multi-factor authorization in an IEEE 802.1x enabled network according to embodiments of the present disclosure.

FIG. 5 illustrates an exemplary process for providing multi-factor authorization in IEEE 802.1x enabled networks according to embodiments of the present disclosure. During operations, a network device determines that an authenticated client device meets criteria for a device quarantine trigger (operation The device quarantine trigger indicates an increased level of suspicion that a current user of the client device is a non-authenticated user.

In some embodiments, the device quarantine trigger includes lapse of a predefined time interval. In some embodiments, the device quarantine trigger includes a change of the client device's posture or geolocation. In some embodiments, the device quarantine trigger includes a threshold number of consecutive failed password attempts.

Next, the network device places the authenticated client device in a quarantine state and suspends network resource access by the authenticated client device (operation 520). Here, the network device only temporarily places the client device from an authenticated state to a quarantined state pending completion of a particular workflow by the current user. While in the quarantined state, the client device has limited access to the network resources regardless of a previous successful user and/or device authentication.

Then, the network device initiates a multi-factor authentication process that requires the quarantined client device user to complete a workflow to confirm user identity (operation 540). In some embodiments, the particular workflow is initiated only for a subset of authenticated client devices in the network. Furthermore, a particular device quarantine trigger defined by network policies is triggered for each authenticated client device in the subset.

Thereafter, the network device determines whether the workflow is successfully completed (operation 560). In response to the workflow not being successfully completed, the network device denies network resource access to the quarantined client device (operation 580), for example, by placing the client device from the quarantined state to an unauthenticated state. The client device has limited or no access to the network resources while in the unauthenticated state. In response to the workflow being successfully completed, the network device grants network resource access to the quarantined client device (operation 590), for example, by placing the client device from the quarantined state to the authenticated state.

In some embodiments, the network device authenticates a client device to obtain access to network resources in a network via a network authentication protocol. The network authentication protocol may be compliant with IEEE 802.1X standard. In one embodiment, the network device receives user credential information from the client device, and authenticates the client device based on validity of the user credential information. In another embodiment, the network device receives a device certificate from the client device, and authenticates the client device based on validity of the device certificate. The device certificate has been issued to the client device upon the previous successful authentication.

System for Providing Multi-Factor Authorization in IEEE 802.1x Enabled Network

Figure 6:
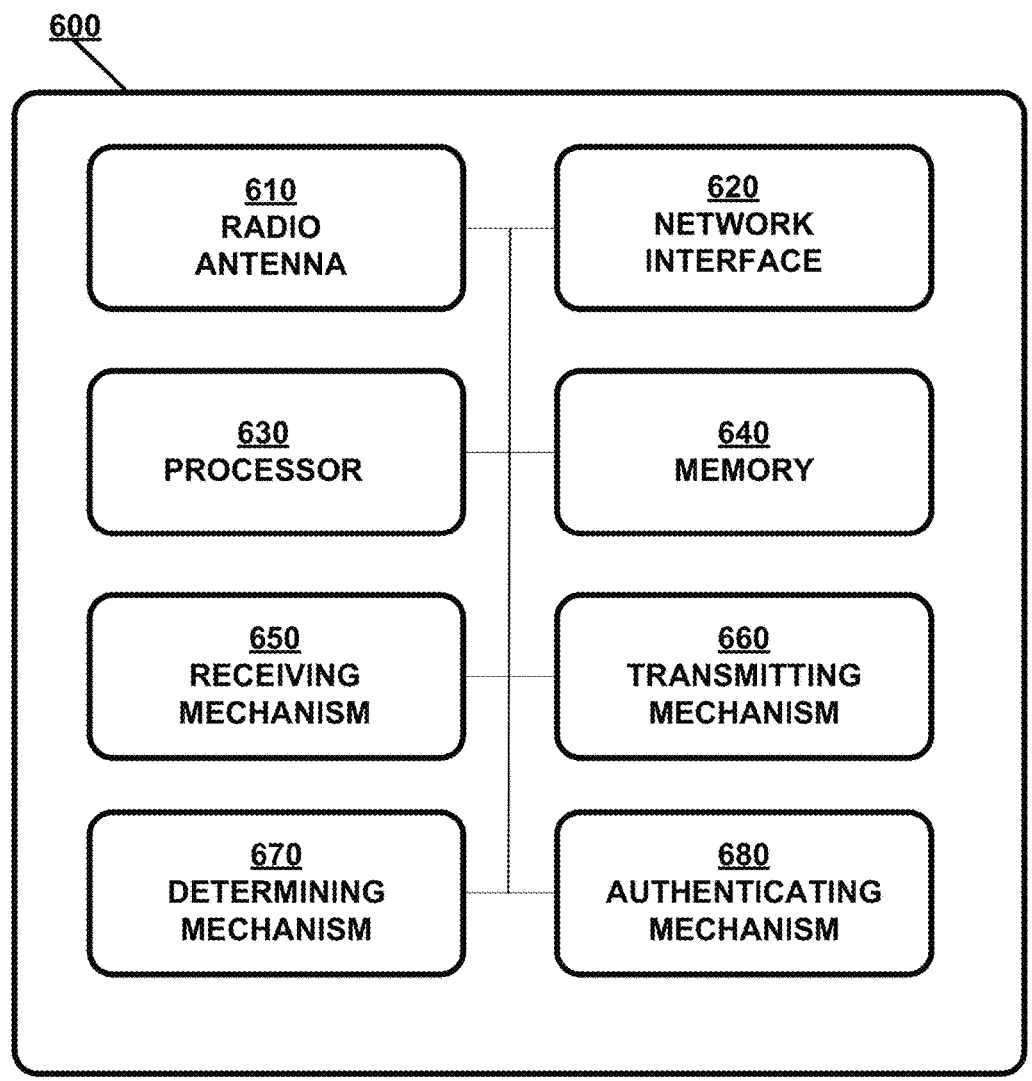
FIG. 6 is a block diagram illustrating a system for providing multi-factor authorization in an IEEE 802.1x enabled network according to embodiments of the present disclosure.

FIG. 6 is a block diagram illustrating an exemplary system for providing multi-factor authorization in IEEE 802.1x enabled networks according to embodiments of the present disclosure. Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes a receiving mechanism 650, a transmitting mechanism 660, a determining mechanism 670, and an authenticating mechanism 680, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc. In particular, in response to determining mechanism 670 determining both (1) that the client device has been authenticated to access the guest wireless network and (2) that the client device is located within close physical proximity to the particular access point, memory 640 will store a timestamp that indicates when the client device exists an authentication zone.

Receiving mechanism 650 generally receives one or more network messages via network interface 620 or radio antenna 610 from a wireless client. The received network messages may include, but are not limited to, requests and/or responses, beacon frames, management frames, control path frames, and so on. Specifically, receiving mechanism 650 may receive user credential information and/or a device certificate from the client device.

Transmitting mechanism 660 generally transmits messages, which include, but are not limited to, requests and/or responses, beacon frames, management frames, control path frames, and so on.

Determining mechanism 670 generally determines that an authenticated client device meets criteria for a device quarantine trigger. The device quarantine trigger typically indicates an increased level of suspicion that a current user of the client device is a non-authenticated user.

In some embodiments, the device quarantine trigger includes lapse of a predefined time interval. In some embodiments, the device quarantine trigger comprises a change of the client device's posture or geolocation. In some embodiments, the device quarantine trigger comprises a threshold number of consecutive failed password attempts.

Authenticating mechanism 680 generally authenticates and/or de-authenticates a client device for wireless network access. Specifically, authenticating mechanism 680 can authenticate a client device to obtain access to network resources in a network via a network authentication protocol. The network authentication protocol is compliant with IEEE 802.1X standard.

In some embodiments, while receiving mechanism 650 receives user credential information from the client device, authenticating mechanism 680 authenticating the client device based on validity of the user credential information.

In some embodiments, while receiving mechanism 650 receives a device certificate from the client device, authenticating mechanism 680 authenticates the client device based on validity of the device certificate. Here, the device certificate has been issued to the client device upon the previous successful authentication.

In some embodiments, in response to determining mechanism 670 determines client device meets criteria for the device quarantine trigger, authenticating mechanism 680 temporarily places the client device from an authenticated state to a quarantined state pending completion of a particular workflow by the current user. The client device has limited access to the network resources while in the quarantined state regardless of a previous successful user and/or device authentication.

In some embodiments, authenticating mechanism 680 initiates multi-factor authentication that requires the current user of the client device to complete the particular workflow to confirm the current user's identity. In response to completion of the particular workflow by the current user, authenticating mechanism 680 places the client device from the quarantined state to the authenticated state. In response to failure of the particular workflow by the current user, authenticating mechanism 680 places the client device from the quarantined state to an unauthenticated state. The client device has limited or no access to the network resources while in the unauthenticated state.

In some embodiments, the particular workflow is initiated only for a subset of authenticated client devices in the network. Further, a particular device quarantine trigger defined by network policies is triggered for each authenticated client device in the subset.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium including instructions executable by a processor to cause the processor to:

determine a device fingerprint of a client device, wherein the instructions to determine the device fingerprint include instructions to:
receive a Dynamic Host Configuration Protocol (DHCP) message from the client device;
determine a type of the client device based on content of the DHCP message; and
determine, based on the content of the DHCP message, that the client device has previously been authenticated;

authenticate the client device to obtain access to network resources in a network in response to the determination of the device fingerprint, wherein the instructions to authenticate the client device include instructions to:
receive a device certificate from the client device, wherein the device certificate was issued to the client device upon the prior successful authentication;
authenticate the client device based on validity of the device certificate;

detect a device quarantine trigger, wherein the device quarantine trigger indicates an increased level of suspicion that a current user of the client device is a non-authenticated user; and in response to the device quarantine trigger, place the client device from an authenticated state to a quarantined state pending completion of a particular workflow by the current user, wherein the client device has limited access to the network resources while in the quarantined state regardless of a previous successful user and/or device authentication.

2. The non-transitory computer readable medium of claim 1, further comprising instructions executable by the processor to cause the processor to initiate a multi-factor authentication that requires the current user of the client device to complete the particular workflow to confirm the current user's identity.

3. The non-transitory computer readable medium of claim 1, further comprising instructions executable by the processor to cause the processor to:
place the client device from the quarantined state to the authenticated state in response to completion of the particular workflow; and
place the client device from the quarantined state to an unauthenticated state in response to a failure to complete the particular workflow, wherein the client device has limited or no access to the network resources while in the unauthenticated state.

4. The non-transitory computer readable medium of claim 1, wherein the authentication to obtain access to the network resources is compliant with IEEE 802.1 X standard.

5. The non-transitory computer readable medium of claim 1, wherein the instructions to authenticate the client device include instructions to:
receive user credential information from the client device; and
authenticate the client device based on validity of the user credential information.

6. The non-transitory computer readable medium of claim 1, wherein the device quarantine trigger comprises lapse of a predefined time interval.

7. The non-transitory computer readable medium of claim 1, wherein the device quarantine trigger comprises a change of the client device's posture or geolocation.

8. The non-transitory computer readable medium of claim 1, wherein the device quarantine trigger comprises a threshold number of consecutive failed password attempts.

9. The non-transitory computer readable medium of claim 1, wherein:
the particular workflow is initiated only for a subset of authenticated client devices in the network; and
a particular device quarantine trigger defined by network policies is triggered for each authenticated client device in the subset.

10. A system comprising:
a device including a hardware processor, the system being configured to perform operations comprising:
determining a device fingerprint of a client device, wherein determining the device fingerprint includes:
determining a Media Access Control (MAC) address of the client device; and
comparing the MAC address of the client device to a plurality of MAC addresses corresponding to a plurality of previously authenticated client devices;
authenticating the client device to obtain access to network resources in a network in response to a determination that the MAC address of the client devices matches a MAC address of the plurality of MAC addresses corresponding to the plurality of previously authenticated client devices, wherein authenticating the client device comprises:
receiving a device certificate from the client device, wherein the device certificate was issued to the client device upon the prior successful authentication; and
authenticating the client device based on validity of the device certificate;
detecting a device quarantine trigger, wherein the device quarantine trigger indicates an increased level of suspicion that a current user of the client device is a non-authenticated user; and
in response to the device quarantine trigger, placing the client device from an authenticated state to a quarantined state pending completion of a particular workflow by the current user, wherein the client device has limited access to the network resources while in the quarantined state regardless of a previous successful user and/or device authentication.

11. The system of claim 10, further comprising initiating a multi-factor authentication, wherein the multi-factor authorization comprises completion of the particular workflow to confirm a user identity.

12. The system of claim 10, further comprising:
placing the client device from the quarantined state to the authenticated state in response to completion of the particular workflow; and
placing the client device from the quarantined state to an unauthenticated state in response to a failure to complete the particular workflow, wherein the client device has limited access to the network resources while in the unauthenticated state.

13. The system of claim 10, wherein the authentication to obtain access to the network resources is compliant with IEEE 802.1 X standard.

14. The system of claim 10, wherein authenticating the client device comprises:
receiving user credential information from the client device; and
authenticating the client device based on validity of the user credential information.

15. The system of claim 10, wherein the device quarantine trigger comprises lapse of a predefined time interval.

16. The system of claim 10, wherein the device quarantine trigger comprises a change of the client device's posture or geolocation.

17. The system of claim 10, wherein the device quarantine trigger comprises a threshold number of consecutive failed password attempts.

18. The system of claim 10, wherein:
the particular workflow is initiated only for a subset of authenticated client devices in the network; and
a particular device quarantine trigger defined by network policies is triggered for each authenticated client device in the subset.

* * * * *